US005279691A

United States Patent [19]

Stickland

[11] Patent Number: 5,279,691

[45] Date of Patent: Jan. 18, 1994

[54] METHOD FOR FORMING A NATURAL WOOD STRAND BUNDLE FOR A RECONSOLIDATED WOOD PRODUCT

[75] Inventor: Frederick T. Stickland, Beaumaris, Australia

[73] Assignee: South Australian Timber Corporation, Australia

[21] Appl. No.: 614,874

[22] Filed: Nov. 16, 1990

[30] Foreign Application Priority Data

Nov. 17, 1989 [AU] Australia .............................. PJ7447

[51] Int. Cl.[5] .............................................. B32B 31/00

[52] U.S. Cl. .................................... 156/264; 144/352; 144/361; 144/362

[58] Field of Search .................... 156/62.2, 62.6, 62.8, 156/264, 304.1, 304.5, 312, 441, 547, 558, 566, 181, 296; 144/348, 350, 352, 361, 362, 1 R, 3 R; 264/128, 112, 115, 120, 70; 19/296

[56] References Cited

U.S. PATENT DOCUMENTS

| | | | |
|---|---|---|---|
| 1,403,722 | 1/1922 | Turnbull | 144/361 |
| 1,644,801 | 10/1927 | Van der Werff | 144/361 |
| 1,693,606 | 12/1928 | Jones | 156/558 |
| 1,931,570 | 10/1933 | Brown et al. | 264/115 |
| 2,928,442 | 3/1960 | Adams et al. | 156/558 |
| 2,961,020 | 11/1960 | Minami | 156/558 |
| 3,508,301 | 4/1970 | Brown | 264/70 |
| 3,549,509 | 12/1970 | Casalina | 264/128 |
| 3,687,773 | 8/1972 | Wangborg | 144/346 |
| 3,963,555 | 6/1976 | Zweig | 156/558 |
| 4,232,067 | 11/1980 | Coleman | 156/264 |
| 4,695,345 | 9/1987 | Grace | 156/264 |
| 4,704,316 | 11/1987 | Grace | 156/180 |
| 4,711,684 | 12/1987 | Coleman | 156/264 |
| 4,711,689 | 12/1987 | Coleman | 156/264 |
| 4,809,404 | 3/1989 | Lasenga | 19/296 |

*Primary Examiner*—Michael W. Ball
*Assistant Examiner*—Steven D. Maki
*Attorney, Agent, or Firm*—Zarley, McKee, Thomte, Voorhees & Sease

[57] ABSTRACT

A process and apparatus for forming a reconsolidated wood product, and a partially rended natural wood bundle therefor, comprises partially rending natural wood to form a plurality of flexible open lattice work webs each of naturally interconnected wood strands which are generally aligned along a common grain direction with a substantial proportion of the strands in each web being substantially discrete but incompletely separated from each other. Each web is of increased width laterally and correspondingly decreased thickness compared to the natural wood but they may vary in dry wood densities. To avoid this the webs are compacted widthwise to substantially uniform dry wood densities and this may involve weighing the webs and measuring their moisture content. The compacted webs are then abutted width-to-width and partially rended natural wood bundles of preselected widths and dry wood densities are cut from the mat. The bundles may then be at least partly superposed, compressed and bonded together to form the desired product.

28 Claims, 3 Drawing Sheets

METHOD FOR FORMING A NATURAL WOOD STRAND BUNDLE FOR A RECONSOLIDATED WOOD PRODUCT

The present invention relates to an improved method and apparatus for use in producing reconsolidated wood products.

Australian Patent Specification 510,845 describes a reconsolidated wood product formed from at least one flexible open lattice work web of naturally interconnected wood strands generally aligned along a common grain direction, a substantial proportion of said strands being substantially discrete but incompletely separated from each other; said web having been consolidated by compression whilst substantially maintaining the wood strands aligned along said common grain direction and said strands being bonded together to hold them in juxtapositions assumed pursuant to said consolidation.

That patent specification also describes a process for forming a reconsolidated wood product, the process comprising the steps of partially rending natural wood to form a flexible open lattice work web of naturally interconnected wood strands which are generally aligned along a common grain direction, a substantial proportion of said strands being substantially discrete but incompletely separated from each other, compressing the web to consolidate the strands whilst maintaining them such as to substantially extend in said original grain direction and bonding said strands together to hold them in juxtapositions assumed pursuant to said consolidation.

The process described in Australian Patent Specification 510,845 has been found to be generally quite satisfactory. However, the quality of the resultant product is influenced by the quality of the webs used to form the product and International Patent Application PCT/AU89/00215 describes one preferred method for forming the open lattice work web of naturally interconnected wood strands.

Commonly, the reconsolidated wood product will be formed from a plurality of the webs which are superposed and Australian Patent Specification 563,123 describes one arrangement of how the webs may be superposed to form an elongate product.

In order to achieve optimum physical parameters for the reconsolidated wood product, it is advantageous for all of the natural wood strand bundles that are used to build up the reconsolidated wood product to have substantially uniform dry wood densities. The partial rending process described in International Patent PCT/AU89/00215 is designed to minimise increasing the length of the natural wood, so that the flexible open lattice work webs can be made with uniform length by trimming the natural wood to the same length before the rending process. The width of any one of the webs, and the amount of wood material it contains, will depend on the diameter of the original natural wood for example a log, and the density of the wood. Preferably the natural wood is not cut in any way along the grain prior to rending.

The moisture content of the webs will also be at least partly a function of the original natural wood moisture content.

The logs used for the manufacture of reconsolidated wood products as described in the aforementioned patent specifications may vary in diameter within the range 50 to 300 mm but in any event within the range specified for a particular manufacturing plant, typically 70 to 170 mm at the large end. These logs commonly taper so that the corresponding small end diameter range for such logs of about 3 m length may be expected to be of the order of 50 to 150 mm. The taper tends to vary from log to log and along the logs within the range 2 to 20 mm/m.

Considering only the large end diameters, the sectional area variation across this specification range of 70 to 170 mm is 0.0038 to 0.0227 $m^2$, a ratio of nearly 1:6. If the logs were individually fed it would be expected, since the web thickness is generally controlled by the machinery, that the web widths will vary within in this ratio also. The range may be reduced by multiple feedings of small logs, but it is unlikely that the range of web widths would be less than at least a 1:2 ratio.

It is an object of the present invention to produce a partially rended natural wood bundle for use in the processes of the aforementioned patent specifications which is capable of providing optimum physical parameters in the reconsolidated wood product.

According to the present invention there is provided a process for forming a partially rended natural wood bundle suitable for compression to form a reconsolidated wood product, the process comprising partially rending natural wood to form a plurality of flexible open lattice work webs each of naturally interconnected wood strands which are generally aligned along a common grain direction, a substantial proportion of said strands in each web being substantially discrete but incompletely separated from each other, each said web being of increased width laterally of said common grain direction and correspondingly decreased thickness compared to the natural wood, compacting each web widthwise to give the webs substantially uniform dry wood densities, forming a continuous substantially uniform density partially rended natural wood mat by abutting the compacted webs width to width and cutting a partially rended natural wood bundle of preselected width from said mat.

Further according to the present invention there is provided a process for forming a reconsolidated wood product which comprises the steps of partially rending natural wood to form a plurality of flexible open lattice work webs each of naturally interconnected wood strands which are generally aligned along a common grain direction, a substantial proportion of said strands in each web being substantially discrete but incompletely separated from each other, each said web being of increased width laterally of said common grain direction and correspondingly decreased thickness compared to the natural wood, compacting each web widthwise to give the webs substantially uniform dry wood densities, forming a continuous substantially uniform density partially rended natural wood mat by abutting the compacted webs width to width, cutting a plurality of partially rended natural wood bundles of preselected width from said mat, at least partly superposing the bundles, compressing the superposed bundles to consolidate the strands whilst maintaining them such as to extend in said original grain direction and bonding the strands of the bundles together to hold them in juxtapositions assumed pursuant to said consolidation.

Still further according to the present invention there is provided a reconsolidated wood product when formed by the process described in the immediately preceding paragraph.

Yet still further according to the present invention there is provided an apparatus for forming a partially rended natural wood bundle suitable for compression to form a reconsolidated wood product, the apparatus comprising means for partially rending natural wood to form a plurality of flexible open lattice work webs each of naturally interconnected wood strands which are generally aligned along a common grain direction, a substantial proportion of said strands in each web being substantially discrete but incompletely separated from each other, means for compacting each web widthwise laterally of said common grain direction according to the dry wood density of said web, means for displacing the compacted webs such that they are abutted width to width and means for cutting a partially rended natural wood bundle of preselected width from the abutted webs.

By the present invention, natural wood bundles each comprising a flexible open lattice work of naturally interconnected wood strands which are generally aligned along a common grain direction with a substantial proportion of the strands in each bundle being substantially discrete but incompletely separated from each other can be formed with a substantially uniform dry wood density and width. Generally also the bundles will have uniform lengths and thicknesses.

Where any one partially rended natural wood bundle comprises parts of two adjacent compacted webs abutted together, the join is along the common grain direction, not across the grain, so that in the reconsolidated wood product the join tends neither to be visible nor to have any adverse effect on the physical properties of the reconsolidated wood product. Thus, the join between adjacent part webs in the reconsolidated wood product is no different to the join between adjacent superposed natural wood bundles in the product and there is a degree of diffusion of the edge strands across the boundaries between adjacent part webs.

Even when compacted in accordance with the present invention, the webs will retain some flexibility and conveniently when a compacted web is abutted with a previously compacted web there is some additional compaction and at least partial subsequent relaxation which causes diffusion of the edge strands of the adjacent compacted webs across the boundary. Additionally, the abutted webs may be transported over some distance before the individual partially rended natural wood bundles are separated therefrom and, during this time, additional diffusion of the edge strands may occur across the boundaries due to changes in direction of the abutted webs. Further, diffusion of the edge strands may be caused by, for example, heat if the abutted webs are dried prior to cutting a bundle therefrom, and vibration.

In order to allow for variations in moisture content in the webs prior to compaction, for example should the partially rended webs be produced from natural wood logs having varying water contents, it is advantageous to determine the moisture content of each web. Conveniently this is achieved by means of a moisture meter disposed adjacent the path of the webs prior to compaction. The particular type of moisture meter is not important to the present invention and many types will be readily ascertainable by those skilled in the art. Preferably, an electronic moisture meter is disposed beneath a belt conveying the webs to measure the average moisture content of each web.

Each web may also be weighed prior to being compacted, for example on a weighing conveyor, to facilitate the calculation of the dry wood density of the web prior to compaction, and therefore the degree of compaction required to produce the desired uniform dry wood density.

Preferably in the process of the invention the step of forming the mat by abutting the compacted webs width to width comprises displacing a compacted web into engagement with a trailing end of the mat. The mat may be displaced substantially continuously from a mat forming station to a bundle cutting station, and the bundle is cut from a leading end of the mat. Advantageously, each compacted web is displaced into engagement with the trailing end of the mat by means which performs the compacting of the webs.

The compacting means advantageously comprises selectively advanceable and retractable restraining means for maintaining a desired thickness of each web during compaction. Compaction may be performed by a selectively advanceable and retractable sweep which is capable of being displaced relatively towards a selectively advanceable and retractable gate against which the web is compacted by the sweep. Most advantageously, the compacting means includes a proportional harrow comprising an array of tines which are selectively advanceable to project into the web and which are displaceable relatively towards the gate proportionally with the sweep according to their relative location between the sweep and the gate.

When the abutted webs are advanced substantially continuously with the addition of newly compacted webs and the or each bundle of partially rended natural wood is cut from a leading end of the abutted webs, it is convenient that the cutting means, for example, a guillotine is displaced correspondingly as it performs the cutting of the bundle.

One embodiment of process and apparatus in accordance with the invention will now be described by way of example only with reference to the accompanying drawings in which.

Figure 1:
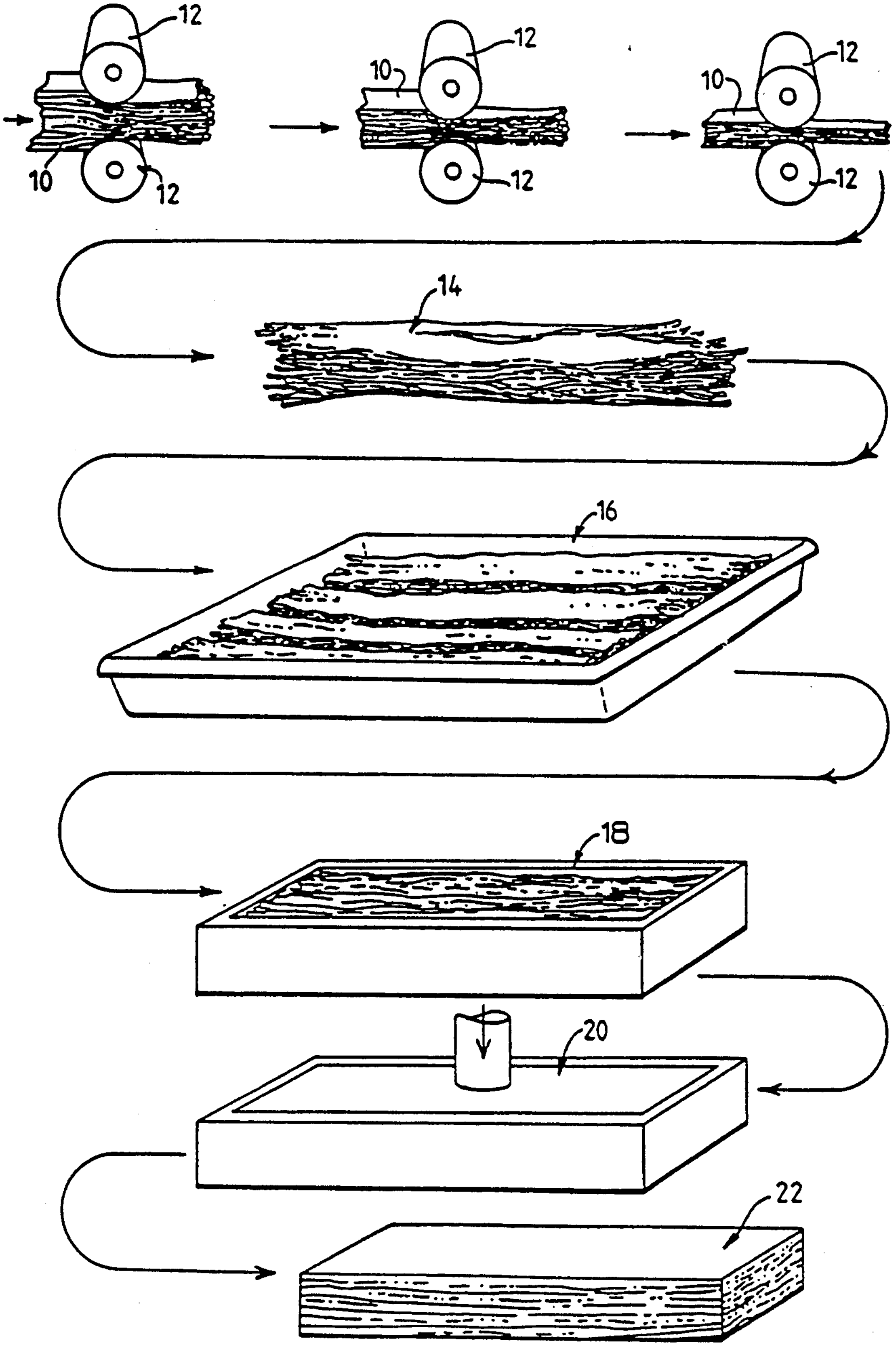
FIG 1 (PRIOR ART)
FIG. 1 is a diagram showing the steps in processing reconsolidated wood products in accordance with the invention described in the aforementioned Australian Patent No. 510,845.

Referring now firstly to FIG. 1, in the process of Australian Patent Specification 510,845 natural wood logs 10 are first partially broken down by being passed successively between rollers 12 of one or more plain roller pairs to induce cracking and then progressively to open up the log structure to form it into a web of loosely interconnected splinter-like strands (called "splinters" in Patent Specification 510,845).

The resultant web, shown at 14 in FIG. 1 is of flexible open lattice work form, individual strands generally maintaining the original grain direction of the wood. Adhesive is then applied to the webs 14 such as by immersion in a suitable liquid adhesive in a bath 16 as shown, but preferably in accordance with our copending International Patent Application PCT/AU87/00437. After removal of excess adhesive, a plurality of webs 14 are assembled together in superposed manner, for example in a suitable mould 18, such that the individual webs in the assemblage are aligned in a common grain direction. The assemblage of thus aligned webs is then compressed in mould 18 such as by compression between the base of the mould and an upper press element 20 as shown, and the adhesive is cured while the webs are compressed to form the final product 22. The axes of the webs may be inclined relative to the longitudinal axes of the product, for example to make an elongate reconsolidated wood product as described with reference to Australian Patent Specification 563,123, and the consolidation of the webs by compressing and curing may be performed in a continuous, semi-continuous or batch manner.

The formation of the intermediate web 14 has been found to be of some importance in practising the process described immediately above and most preferably, the web resulting from the initial cracking by being passed through the plain rollers 12 is spread and refined for example as defined, in our copending Application PCT/AU89/00215.

The reduction and refining process described above is designed to avoid increasing the length of the natural wood during its transformation from the solid piece 10 such as a log to the web, so that the webs can be made with uniform length by trimming the raw materials to the same length. However, the width of any web, and the amount of wood material it contains, will depend upon the diameter of the original log and the density of the wood. Any variation in the log diameter and wood density will thus lead to a variation in the width of the webs and in their density which will be reflected in the final product made directly from those webs, particularly in the physical properties such as end strength.

Figure 2:
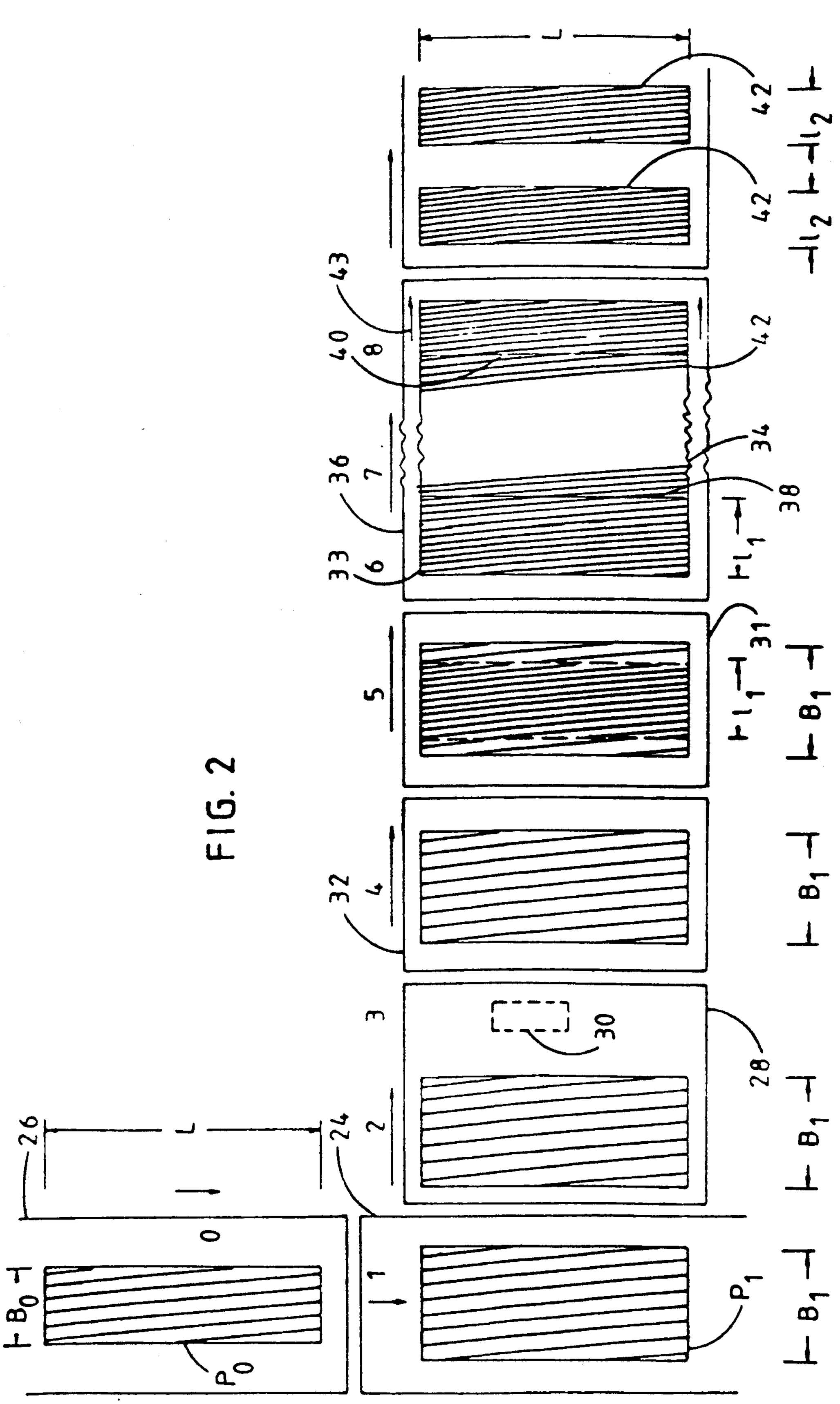
FIG. 2 is a schematic representation of the method and apparatus in accordance with the present invention.

Referring now to FIG. 2, there is shown apparatus which may be installed in the apparatus of FIG. 1 immediately upstream of the bath 16 to produce partially rended natural wood bundles of uniform width and dry wood density.

At stations 0 and 1 in FIG. 1, the successive webs P1 and P0 corresponding to the web 14 in FIG. 1, preferably after it has been through the refining process of International Patent Application PCT/AU89/00215, are displaced axially relative to their wood grain direction on respective conveyors 24 and 26. The wood grain direction is represented in FIG. 2 by the hatching which is shown inclined to the longitudinal direction only to avoid confusion in subsequent steps of the drawing. Both the webs P0 and P1 have length L and their widths are B0 and B1 respectively. When the web P1 arrives at the position shown in FIG. 2 with its leading end accurately positioned, the conveyor 24 with the web thereon is halted.

A station 2, the web P1 has been moved bodily onto a transversely moving conveyor 28 with its external dimensions unchanged. The conveyor 28 carries the web P1 over an electronic moisture meter 30 located beneath the conveyor 28 at station 3. The meter 30 measures the average moisture content of the web as its passes thereover. The moisture meter 30 may be a proprietary device which measures the capacitance of the web as it passes over the meter, as well as the path length in the web over which the capacitance determination is made, by gamma-ray adsorption.

Upstream of the moisture meter, after the web exits from the final scrimming mill, the density of the web may be monitored by a line scan video camera (not shown) which operates on the measurement of reflected light density. The measured data are signalled to a programmable logic controller (not shown), which calculates the density of the web while monitoring other parameters such as web width. If these parameters and/or the calculated density of a web do not fall within a preset range, t he controller may signal that the web is to be discarded.

At station 4, the web P1 has been passed onto a weighing conveyor 32 on which its mass is determined. The weighing conveyor 32 may comprise a conveyor module mounted on a suitable lever system incorporating load cells (not shown).

The moisture meter 30 and weigh conveyor 32 may be of known design and will be readily ascertainable by those skilled in the respective art.

The weighed web P1, still with width B1, is transported to a compaction station 5 on a conveyor 31 where it is compressed in width to a dimension 1 (shown by dashed lines in the web), calculated from the mass and moisture content of the web. The conveyor 31 may be stopped during compaction.

The compacted width $l_1$ is given by the formula $$l_1 = \frac{Mw}{D} \quad (1)$$

where Mw is the dry wood content of a web, and D is the desired dry wood density of the compacted web, per unit length.

The dry wood content, Mw of a web is calculated by the formula $$Mw = Mp\,\frac{100 - W}{100}\text{, where} \quad (2)$$

Mp is the total mass of the web, and W is the moisture content of the web, expressed as a percentage of the total web mass Mp. Combining equations 1 and 2

$$l_1 = \frac{Mp(100 - W)}{D(100)} \quad (3)$$

Compaction of the web P1 is performed by a harrow compactor 44 described hereinafter with reference to FIGS. 3 and 4 and controlled according to equation (3) to uniformly reduce the web width to the value $l_1$. The web length remains unaltered, and after compaction the web will have the desired density D. The compacted web 33 is then transported by the harrow compactor 44 to station 6 where it is added to a continuous mat 34 of previously compacted abutted webs all having a substantially uniform dry wood density D.

The mat 34 is transported on a conveyor 36 which displaces the mat at a constant speed away from the building station 6, and the harrow compactor 44 adds the compacted web 33 to the moving continuous mat 34 at the location where the trailing end of the previously added compacted web would have arrived in the elapsed time.

The abutment of the compacted web 33 with the trailing end of the continuous mat 34 will tend to cause a small amount of additional compaction of the flexible web 33 and mat 34 at the abutting edges, and subsequent relaxation. This together with vibration caused b displacement of the conveyor 36 will tend to cause diffusion of the edge strands of the adjacent abutting webs across the boundary 38 and interlocking of the strands.

At station 7, the continuous mat 34 is processed as required, for example by passing it through a dryer (not shown) where the moisture content is reduced uniformly to the desired amount. Heat from such drying operation may tend to cause additional interlocking of the adjacent webs. Furthermore, the conveyor 36 may follow a serpentine course and any changes in direction of the moving mat 34 will also cause additional interlocking.

At station 8 the leading end of the continuous mat 34 is cut to form discrete partially rended natural wood bundles of uniform width $l_2$, for example 1 meter, and substantially uniform dry wood density. The cutting may be performed by a guillotine shown schematically at 40, producing the bundles 42 which have the same length L and substantially uniform thickness by virtue of the reduction and refining process performed upstream of station 0.

Plural partially rended natural wood bundles 42 may then have adhesive or other bonding agent applied to them and be at least partly superposed, for example as previously herein described, prior to compaction and curing to form the reconsolidated wood product.

The harrow compactor at station 5 compacts the web P1 so that it has parallel opposed sides. This will create a compacted web of uniform density along its length L provided the non-compacted web was of constant width and density or varying width along its length and reciprocally varying density. A log taper such as that described hereinbefore would produce a trapezoidal shaped compacted web if compressed to the same density along its length, but in the harrow compactor at station 5 produces a density gradient along its length, or across the mat 34. Some compensation can be provided for this density gradient by alternating the log orientations, preferably prior to the reduction and refining process. In this way the density gradients for successive compacted webs are reversed and the consequent inbuilt variable compressions in the mat 34 will tend to relax to uniformity during passage of the mat to the cutting station 8. However, it will be appreciated that because of the variation of log taper the density gradients across the mat 34 cannot be corrected absolutely and some variability in the surface density of the mat may be unavoidable.

Figure 3:
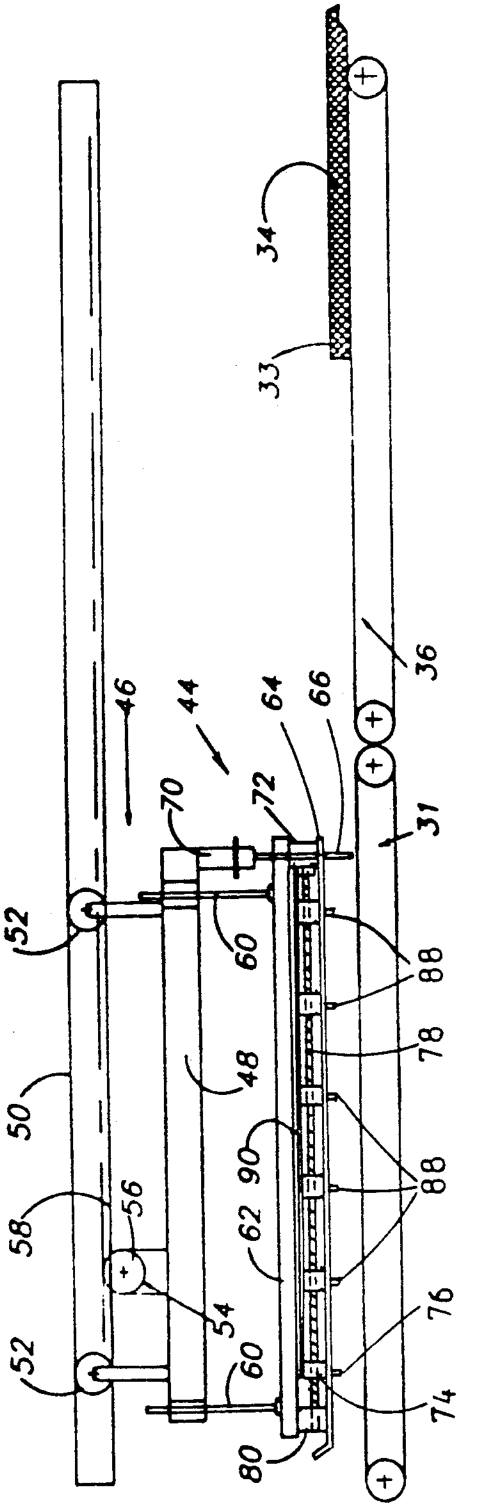
FIG. 3 is an elevational view of a harrow compactor for use in the present invention.
Figure 4:
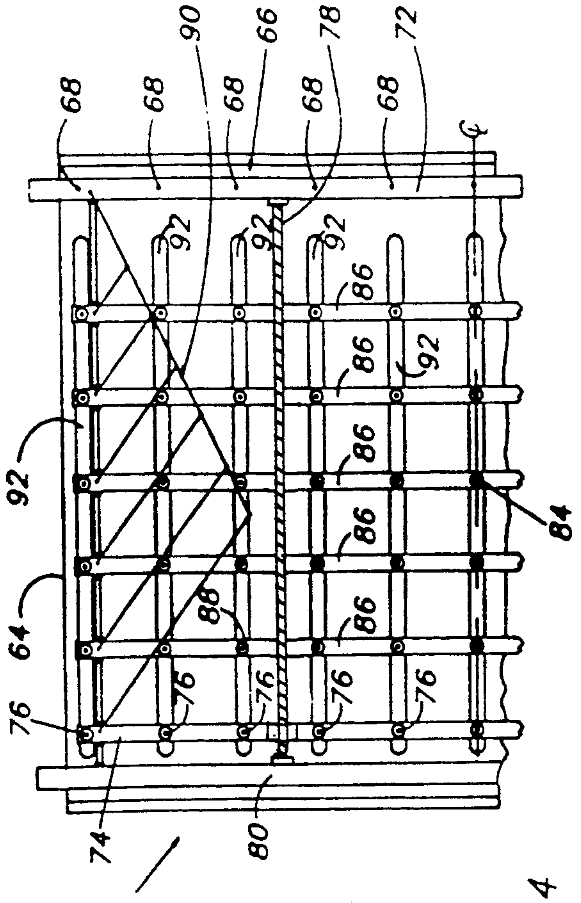
FIG. 4 is a partial plan view of the harrow compactor with various parts omitted for clarity.

Referring now to FIGS. 3 and 4, the harrow compactor 44 is supported from a transfer unit 46 comprising a carriage 48 supported on a track which extends over stations 5 and 6. The carriage 48 is supported on the track by means of ball bearing machine slides 52 and is displaceable along the track by means of an AC servo motor 54 driving through a pinion 56 which engages a rack 58 supported relative to the track 50. This arrangement provides skid free drive and the servo motor 54 is equipped with an encoder (not shown) which makes it capable of controlling the position of the carriage, preferably within ±1 mm along the track. In the preferred embodiment, the transfer unit 46 shall having sufficient power to accelerate at 2.4 m/sec, while the harrow compactor 44 suspended from it drags a scrim over the surface of the conveyors 31 and 36. The transfer unit may travel at a velocity of 1.7 m/sec.

The harrow compactor 44 is supported from the carriage 48 by means of pneumatically driven legs 60 which support a compactor head 62 from which is supported a horizontal restraining plate 64 which overlies the conveyors 31 and 36 and is adapted to restrain the webs during compaction. The restraining plate 64 is thus capable of being raised and lowered by means of the pneumatically driven legs 60.

Supported from the leading end of the restraining plate 64 is a gate 66 against which the webs are compacted by the harrow compactor 44. The gate 66 comprises a set of spaced pneumatically retractable tines 68 driven by respective pneumatic piston and cylinder assemblies 70 (one only shown) carried by the carriage 48. The tines 68, are guided for their reciprocatory movement in a leading frame member 72 of the compactor head 62. The gate tines 68 are movable independently of the restraining plate 64 and clear the surface of the compacting conveyor 31 by, for example, 5 mm when extended.

A horizontally movable compactor sweep 74 comprising a rake with pneumatically retractable tines 76 is supported for vertical movement towards the trailing end of the restraining plate 64. The sweep 74 is displaceable longitudinally of the harrow compactor relative to the gate 66 by means of a screw threaded shaft 78 which extends between the leading frame member 72 and a trailing frame member 80 and is rotatable by means of an AC servo motor (not shown). The screw threaded shaft engages a cooperating nut 82 on the sweep 74 whereby rotation of the shaft 78 displaces the sweep. The servo motor driving the sweep 74 may be equipped with an encoder so that it is capable of controlling the position of the sweep relative to the gate 66 to an accuracy within ±1 mm.

The sweep 74 is supported for vertical movement with the restraining plate 64 but the tines 76 are independently pneumatically able to be raised and lowered.

Between the gate 66 and sweep 74 a proportional harrow 84 is supported with the restraining plate 64, the proportional harrow comprising five rakes 86 each having an array of pneumatically retractable tines 88. Each rake 86 is arranged parallel to the compactor sweep 74 and is connected to it by a proportional linkage 90 so that the position of each rake 86 is in constant proportion to the distance between the gate 66 and the sweep 74. Retraction and extension of the tines 88 can be effected independently of the motion of any other of the mechanisms of the harrow compactor 44 but the rakes 86 are movable vertically with the restraining plate 64. The tines 76 and 88 are movable horizontally in parallel slots 92 in the restraining plate 64 through which they project.

The base position of the compacting harrow 44 is as illustrated in FIG. 3 at station 5 over the compacting conveyor 31 with the gate tines 68 extended, the restraining plate 64 raised, the tines 76 of the compactor sweep 74 raised and the tines 88 of the proportional harrow 84 raised.

The compactor conveyor 31 carries the web P1 with width B1 into position against the gate 66. The operating cycle of the harrow compactor 44 is then as follows:

1. Restraining plate 64 lowered and sweep tines 76 extended,
2. Sweep 74 travel commences by rotation of the screw threaded shaft 78 and continues to a predetermined location determined by the desired width $l_1$;
3. When the sweep tines 76 contact the upstream edge of the web the proportional harrow tines 88 extend to perform compaction as the sweep travel continues,
4. When compaction is complete, the transfer carriage 48 travel commences, for example accelerating at 2.4 m/sec/sec to a velocity of 1.7 m/sec, 5. When a predetermined position, for example 600 mm, from its designation (a point on the conveyor 36 which moves at a velocity up to for example 4 m/min) the carriage 48 commences to decelerate,
6. The carriage 48 reaches its designation and holds station on the moving conveyor 36; this position will be immediately adjacent the trailing end of a compacted web 33 previously added to the mat 34 on the conveyor 36,
7. Gate, sweep and harrow tines 68, 76 and 88 retract simultaneously,
8. Restraining plate 64 is raised allowing the newly added compacted web to continue to travel as part of the web 34,
9. The carriage 48 reverses its motion back to the base position, and
10. Gate tines 68 extend.

This cycle is repeated, for example at rates up to 375 cycles per hour, for each web to be compacted, the actual compaction being determined according to equation 3.

Referring now again to FIG. 2, the guillotine 40 operates as the mat 34 is displaced with the conveyor and is therefore arranged to travel in a direction parallel to and at the same speed as the conveyor, for example on low friction slides, during the cutting operation, as shown by the arrows 43.

Those skilled in the art will appreciate that the invention described herein is susceptible to variations and modifications other than those specifically described. It is to be understood that the invention includes all such variations and modifications which fall within its spirit and scope.

I claim:

1. A process for forming partially rended natural wood bundles suitable for compression to form a reconsolidated wood product, the process comprising:

partially rending natural wood to form a plurality of flexible open lattice work webs each of naturally interconnected wood strands which are generally aligned along a common grain direction, a substantial proportion of said strands in each web being substantially discrete but incompletely separated from each other, each web being of increased width laterally of said common grain direction and correspondingly decreased thickness compared to the natural wood;

compacting each web widthwise to give the webs substantially uniform dry wood densities;

forming a continuous substantially uniform density partially rended natural wood mat by abutting the compacted webs width to width; and cutting a plurality of partially rended natural wood bundles of preselected width from said mat, said bundles having substantially uniform dry wood densities, and each each bundle comprising a flexible open lattice work of naturally interconnected wood strands which are generally aligned along a common grain direction with a substantial proportion of said strands in the bundle being substantially discrete but incompletely separated from each other.

2. A process according to claim 1 wherein the step of forming the mat by abutting the compacted webs width to width comprises displacing a compacted web into engagement with a trailing end of the mat.

3. A process according to claim 2 wherein the engagement step is such that the compacted web and trailing end of the mat are additionally compacted widthwise and subsequently the additional compaction is at least partly released.

4. A process according to claim 1 wherein the mat is subjected to vibration so as to cause increased diffusion of the strands of the adjacent abutting webs and interlocking of the stands.

5. A process according to claim 1 wherein the abutting webs in the mat are subjected to a drying step by passing them through a dryer.

6. A process according to claim 2 wherein the mat is displaced substantially continuously from a mat forming station to a bundle cutting station, and each bundle is cut from a leading end of the mat.

7. A process according to claim 6 wherein the mat is subjected to changes of direction so as to cause increased interlocking of the stands.

8. A process according to claim 2 wherein each compacted web is displaced into engagement with the trailing end of the mat by means which performs the compacting of the webs.

9. A process according to claim 8 wherein compaction of each web is substantially completed before that web is displaced for engagement with the mat.

10. A process according to claim 8 wherein the compaction of each web is maintained by said compacting means until the compacted web is displaced into engagement with the mat.

11. A process according to claim 1 wherein compaction of each web is performed by introducing a plurality of tines into the web and displacing a plurality of the web proportionally according to the relative widthwise position of each tine in the web.

12. A process according to claim 1 which comprises measuring the moisture content of each web prior to its compaction.

13. A process according to claim 1 which comprises weighing each web prior to its compaction.

14. A process according to claim 1 wherein the natural wood comprises a plurality of logs which taper in diameter along their length, each said log being partially rended to form a respective one of the webs with a density gradient along its length substantially corresponding to the taper, and wherein adjacent webs in the mat are disposed with their density gradients extending in opposite directions.

15. A process for forming a reconsolidated wood product which comprises the steps of:

partially rending natural wood to form a plurality of flexible open lattice work webs each of naturally interconnected wood strands which are generally aligned a common grain direction, a substantial proportion of said strands in each web being substantially discrete but incompletely separated from each other, each web being of increased width laterally of said common grain direction and correspondingly decreased thickness compared to the natural wood, compacting each web widthwise to give the webs substantially uniform dry wood densities, forming a continuous substantially uniform density partially rendered natural wood mat by abutting the compacted webs width to width, cutting a plurality of partially rended natural wood bundles of preselected width from said mat, said bundles having substantially uniform dry wood densities, and each bundle comprising a flexible open lattice work of naturally interconnected wood strands which are generally aligned along a common grain direction with a substantial proportion of said strands in the bundle being substantially discrete but incompletely separated from each other, at least partly superposing the bundles, compressing the superposed bundles to consolidate the strands whilst maintaining them such as to extend in said original grain direction, and bonding the strands of the bundles together with a bonding agent to hold them in juxtapositions assumed pursuant to said consolidation.

16. A process according to claim 15 wherein the step of forming the mat by abutting the compacted webs width to width comprises displacing a compacted web into engagement with a trailing end of the mat.

17. A process according to claim 16 wherein the engagement step is such that the compacted web and trailing end of the mat are additionally compacted widthwise and subsequently the additional compaction is at least partly released.

18. A process according to claim 15 wherein the mat is subjected to vibration so as to cause increased diffusion of the strands of the adjacent abutting webs and interlocking of the strands.

19. A process according to claim 15 wherein the abutted webs in the mat are subjected to a drying step by passing them through a dryer.

20. A process according to claim 16 wherein the mat is displaced substantially continuously from a mat forming station to a bundle cutting station, and each bundle is cut from a leading end of the mat.

21. A process according to claim 20 wherein the mat is subjected to changes of direction so as to cause increased interlocking of the strands.

22. A process according to claim 16 wherein each compacted web is displaced into engagement with the trailing end of the mat by means which performs the compacting of the webs.

23. A process according to claim 22 wherein compaction of each web is substantially completed before that web is displaced for engagement with the mat.

24. A process according to claim 22 wherein the compaction of each web is maintained by said compacting means until the compacted web is displaced into engagement with the mat.

25. A process according to claim 15 wherein compaction of each web is performed by introducing a plurality of tines into the web and displacing the tines widthwise of the web proportionally according to the relative widthwise position of each tine in the web.

26. A process according to claim 15 which comprises measuring the moisture content of each web prior to its compaction.

27. A process according to claim 15 which comprises weighing each web prior to its compaction.

28. A process according to claim 15 wherein the natural wood comprises a plurality of logs which taper in diameter along their length, each said log being partially rended to form a respective one of the webs with a density gradient along its length substantially corresponding to the taper, and wherein adjacent webs in the mat are disposed with their density gradients extending in opposite directions.

* * * * *